(12) United States Patent
McClure et al.

(10) Patent No.: US 7,710,731 B2
(45) Date of Patent: May 4, 2010

(54) CHASSIS PARTITION FRAMEWORK FOR PERSONAL CLUSTER COMPUTER

(75) Inventors: John McClure, Taipei (TW); Chun-Hung Lee, Taipei (TW)

(73) Assignee: Mitac International Corp., Taoyuan (TW)

( * ) Notice: Subject to any disclaimer, the term of this patent is extended or adjusted under 35 U.S.C. 154(b) by 624 days.

(21) Appl. No.: 11/626,936

(22) Filed: Jan. 25, 2007

(65) Prior Publication Data

US 2008/0180896 A1 Jul. 31, 2008

(51) Int. Cl.
  *H05K 7/16* (2006.01)
(52) U.S. Cl. .................. 361/727; 361/679.02; 361/724
(58) Field of Classification Search ............ 361/679.02, 361/724–727
  See application file for complete search history.

(56) References Cited

U.S. PATENT DOCUMENTS

| | | | | |
|---|---|---|---|---|
| 3,662,225 | A * | 5/1972 | Carter et al. .................. 361/727 |
| 4,478,331 | A * | 10/1984 | Ruin ........................... 269/93 |
| 5,296,748 | A * | 3/1994 | Wicklund et al. ........... 361/785 |
| 5,398,161 | A * | 3/1995 | Roy ........................... 361/727 |
| 5,687,063 | A * | 11/1997 | Chabert ...................... 361/726 |
| 6,163,464 | A * | 12/2000 | Ishibashi et al. ............ 361/788 |
| 6,335,867 | B1 * | 1/2002 | Ishibashi et al. ............ 361/803 |
| 6,392,142 | B1 * | 5/2002 | Uzuka et al. ................ 361/788 |
| 6,456,498 | B1 * | 9/2002 | Larson et al. ............... 361/726 |
| 6,608,762 | B2 * | 8/2003 | Patriche ..................... 361/796 |
| 6,646,868 | B2 * | 11/2003 | Ho et al. .................... 312/223.2 |
| 6,690,584 | B2 * | 2/2004 | Uzuka et al. ................ 361/785 |
| 6,700,776 | B2 * | 3/2004 | Bang et al. ............. 361/679.58 |
| 6,819,567 | B2 * | 11/2004 | Baker et al. ................. 361/724 |
| 6,870,739 | B2 * | 3/2005 | Groos et al. ................ 361/725 |
| 6,946,602 | B1 * | 9/2005 | Gibbs et al. ................. 361/725 |
| 6,950,895 | B2 * | 9/2005 | Bottom ....................... 361/796 |
| 6,963,495 | B1 * | 11/2005 | Carullo et al. .............. 361/220 |
| 6,999,319 | B2 * | 2/2006 | Wu et al. .................... 361/724 |
| 7,007,809 | B2 * | 3/2006 | Greenside .................. 361/788 |
| 7,212,412 | B2 * | 5/2007 | Carlson et al. .............. 361/727 |
| 7,239,528 | B1 * | 7/2007 | McLeod ...................... 361/788 |
| 7,319,596 | B2 * | 1/2008 | Fujiya et al. ................. 361/727 |
| 7,352,576 | B2 * | 4/2008 | McClure ...................... 361/725 |
| 7,374,259 | B2 * | 5/2008 | Wu et al. ............... 361/679.01 |
| 2002/0006026 | A1 * | 1/2002 | Takahashi et al. ........... 361/724 |
| 2003/0011976 | A1 * | 1/2003 | Treiber et al. ............... 361/683 |
| 2003/0223199 | A1 * | 12/2003 | Smith et al. ................. 361/727 |
| 2004/0001304 | A1 * | 1/2004 | Katagiri et al. ............. 361/679 |
| 2005/0207134 | A1 * | 9/2005 | Belady et al. ............... 361/796 |
| 2005/0219826 | A1 * | 10/2005 | Carlson et al. .............. 361/724 |

(Continued)

*Primary Examiner*—Jayprakash N Gandhi
*Assistant Examiner*—Adrian S Wilson
(74) *Attorney, Agent, or Firm*—Quintero Law Office

(57) ABSTRACT

A chassis partition framework is provided for configuring a personal cluster computer that has a head-node mainboard, a first compute-node mainboard, a second compute-node mainboard, a third compute-node mainboard and a fourth compute-node mainboard. The chassis partition framework mainly includes a top chamber, a left chamber and a right chamber. The top chamber is for configuring the head-node mainboard horizontally. The left and right chambers located under the top chamber are for vertically configuring the first and second compute-node mainboards and the third and fourth compute-node mainboards respectively in face-to-face alignment, with the second and third compute-node mainboards standing in back-to-back alignment. Therefore, the mechanical problems of the conventional blade-type personal cluster computer about heat-dissipation, noise-reduction, expansibility and space-arrangement may be improved through the chassis partition framework.

19 Claims, 6 Drawing Sheets

U.S. PATENT DOCUMENTS

2006/0221579 A1* 10/2006 Liang et al. ............. 361/724
2007/0053169 A1* 3/2007 Carlson et al. ............ 361/727
2007/0223200 A1* 9/2007 Fujiya et al. ............. 361/727
2007/0223201 A1* 9/2007 Fujiya et al. ............. 361/727

* cited by examiner

CHASSIS PARTITION FRAMEWORK FOR PERSONAL CLUSTER COMPUTER

BACKGROUND OF THE INVENTION

1. Field of Invention

The present invention relates to computer chassis framework, and more particularly to a chassis partition framework for a personal cluster computer.

2. Description of the Related Art

As shown in FIG. 1, a personal cluster computer in the prior art performs small-scale but high-complex clustering tasks under so-called "Blade" architecture. As illustrated, the front portion of the inner space of a chassis 10 is configured with plural mainboards (mother boards) 11, wherein all the mainboards 11 are spaced at intervals to split the front portion of the inner space of the chassis 10 into several narrow split spaces as airflow channels, as the common blade architecture. The lower half of the rear portion in the chassis 10 is configured with one or more power supply 12 that has dedicated fan(s); the upper half is configured with several main fans 13 as a major generation source for heat-dissipation airflow. The airflows 14 sucked-in from the front side of the chassis 10 will first flow into each of the split spaces, then pass the main fans 13 and eventually flow out through the rear side of the chassis 10.

However, there will be problems if the chassis architecture disclosed above is applied to implement the personal cluster computer.

First of all, the narrow split spaces hinder the chassis 10 from dissipating heat. Besides, noise may be considered as generated by the impact between the airflow molecules and the objects (electrical members and unsmooth surfaces) of the mother boards 11 that are configured along the airflow path in the split spaces. The narrow space(s) and unsmooth surfaces cause more serious turbulences, which will lead to wind noises. To facilitate the airflows 14 with required flow rate and reach enough wind pressure to flow in/out all the tiny channels between each of the heat fins 110, relative smaller fan(s) 13 is usually used to remain much higher rotation speeds. However, a smaller fan with high speed also causes serious operation noises of high decibel.

Moreover, the narrow split spaces also cause problems while configuring the power distribution board (power switch), KVM switch (Keyboard/Video/Mouse switch), fan control board (fan switch), storage devices, network connection devices or other function modules in an optimal space arrangement. For example, an optimum location in FIG. 1 for implementing hard drive(s) (not shown) might be the space between the two mainboard 11, which will make the split space more crowded. That leads to additional problems, not only influencing the airflow 14 but increasing mechanical interferences while hanging hard drive tray(s) on the mainboard(s) 11.

The power distribution board, fan control board or other small circuit boards with specific functions has another issue. Such boards are usually independent from each other or integrated as one single backplane, and may be configured at those limited, surplus positions of the chassis 10. Except said airflow influence and mechanical interferences, these boards need to be customized as implement-independent shapes, sizes and specifications to meet the internal environment of the chassis 10.

Furthermore, above architecture can not provide sufficient expansion capability for a personal cluster computer. For instance, while applying to high-end image processing tasks for special movie effects, a graphic card is required to be implemented on a head node of the personal cluster computer, which may be realized by one of the mainboard 11. However, the head-node mainboard 11 has only the narrow split space available and needs to use the riser card architecture, which is similar to the one used in a 1 U sever. That causes a crowded split space and the fastening issue for the graphic card. If the expansion function is designed to implement on another expansion circuit board, the location, bus bandwidth and stability issues should all be taken into consideration.

SUMMARY OF THE INVENTION

Accordingly, the present invention provides a chassis partition framework for personal cluster computer to solve the problems of poor heat-dissipation capability, loud noises, improper space arrangement and poor expansibility in the prior art.

In an embodiment of the present invention, the chassis partition framework is provided for configuring a personal cluster computer with a head-node mainboard and first and second, third and fourth compute-node mainboards. The chassis partition framework includes a top chamber, a left chamber and a right chamber. The top chamber is for horizontally configuring the head-node mainboard. The left chamber is located under the top chamber for vertically configuring the first and second compute-node mainboards in face-to-face alignment. The right chamber is located under the top chamber and adjacent to the right side of the left chamber for vertically configuring the third and fourth compute-node mainboards in face-to-face alignment; wherein the third compute-node mainboard and the second compute-node mainboard are configured in back-to-back alignment.

According to an embodiment of the present invention, the chassis partition framework further includes a middle partition board located under the top chamber and between the left and right chambers. The middle partition board is for configuring the second compute-node mainboard and the third compute-node mainboard. Besides, a back chamber may be located under the top chamber and adjacent to the rear sides of the left and right chambers, accompanying with its middle-rear section for configuring back fan(s), its bottom section for configuring one or more power supply and with its top section hanging a rack for configuring network connection device(s) therein.

In accordance with an embodiment of the present invention, the chassis partition framework further includes openable left side-door and right side-door for respectively configuring the first and fourth compute-node mainboards.

According to an embodiment of the present invention, each of the left and right chambers includes comb rail set(s), respectively configuring at the top side and/or the bottom side of each of the left and right chambers. The comb rail set includes plural parallel rails with their rear ends connecting each other, thereby remaining the front side of the comb rail set open but the rear side closed. In addition, the left and right chambers are for containing a left dual-board case and a right dual-board case respectively. Corresponding to the comb rail set, each of the left and right dual-board cases includes positioning rail(s) located at the top side and/or bottom side therein, thereby enabling the left and right dual-board cases to slide into the left and right chambers or slide out. The left dual-board case is mainly for vertically configuring the first and second compute-node mainboards in face-to-face alignment, and the right dual-board case is also for vertically configuring the third and fourth compute-node mainboards in face-to-face alignment. Inside the left or right dual-board case, the inner top side and/or bottom side is for horizontally configuring storage device(s), fan control board, power distribution board and/or signal connection board. Moreover, the left or right dual-board case may includes a cover with a handle to be configured at its front side; wherein the cover includes airflow hole(s) for configuring front fan(s).

In accordance with an embodiment of the present invention, the chassis partition framework further includes several trays for configuring the first, second, third and fourth compute-node mainboards, thereby enabling the compute-node mainboards to be pushed into the left chamber or the right chamber or pull out. Additionally, the inner top side and/or bottom side of the left or right chamber may be horizontally configured with storage device(s), fan control board, power distribution board and/or signal connection board. The front side of the left or right chamber may be configured with front fan(s).

According to an embodiment of the present invention, the chassis partition framework further includes an upper partition board to divide the top chamber and the left and right chambers below and to be configured with the head-node mainboard at the bottom of the top chamber. The top chamber is for configuring plural hard drive(s), disk player(s) and/or I/O device switch(s) at its front side, and top fan(s) at its rear side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

Figure 2:
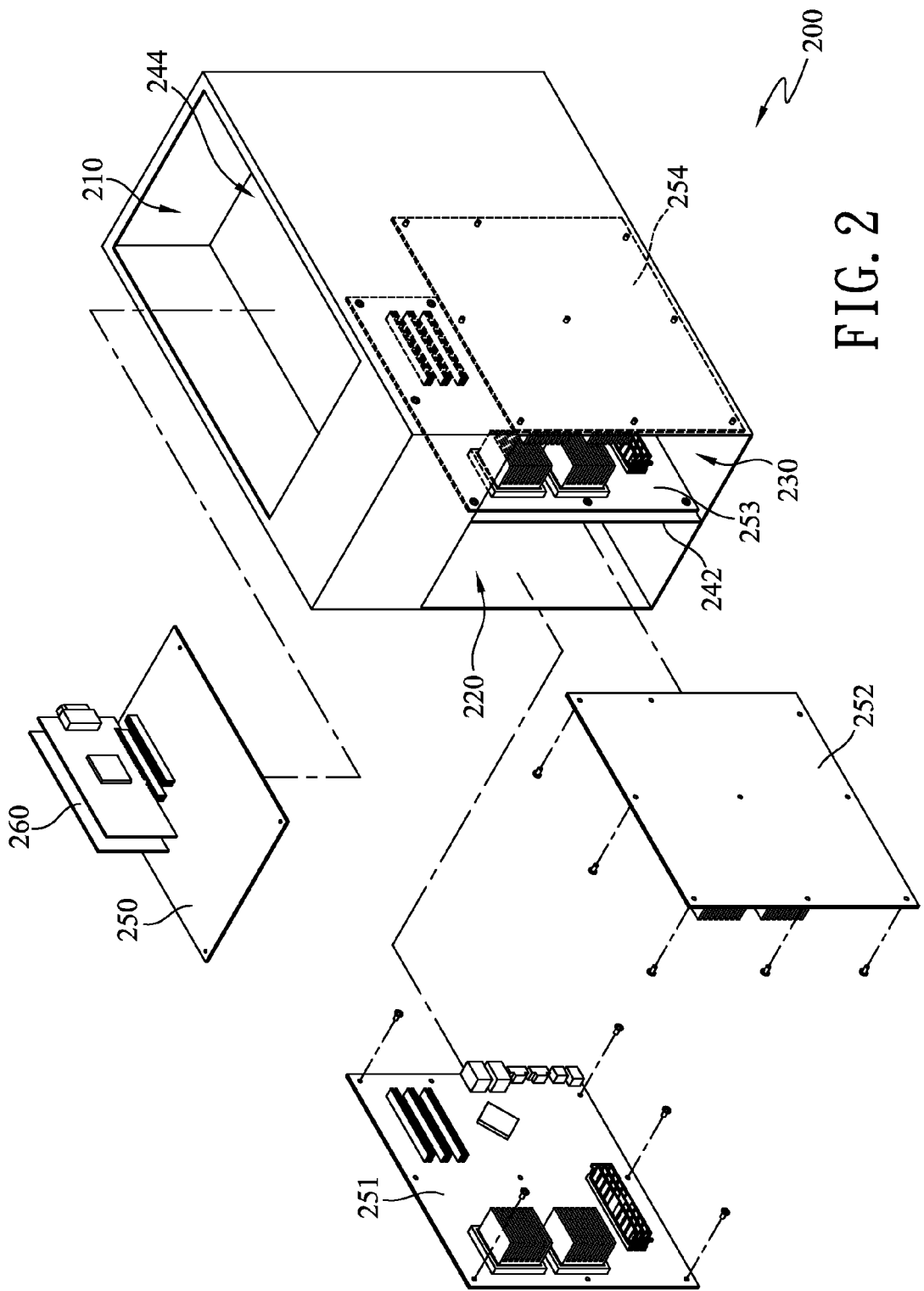
FIG. 2 is an explanatory diagram of a chassis partition framework for a personal cluster computer according to the first embodiment of the present invention.

Please refer to FIG. 2. In the first embodiment of the present invention, a chassis partition framework 200 provided for a personal cluster computer is in the shape of rectangular solid, which may be realized by frameworks and boards (both not marked). The chassis partition framework mainly includes a top chamber 210, a left chamber 220 and the right chamber 230, all in the shape of rectangular solid. By means of configuring a middle partition board 242 at the bottom, front-middle section of the chassis partition framework 200, the left and right chambers 220,230 may be divided accordingly. By configuring an upper partition board 244 horizontally at the upper section of the chassis partition framework 200, the top chamber 210 and the left/right chamber 220/230 may be divided. The middle partition board 242 and the upper partition board 244 may be complete boards or have hole(s) in various sizes.

The personal cluster computer to apply the chassis partition framework 200 of the present invention mainly includes a head-node mainboard 250, a first compute-node mainboard 251, a second compute-node mainboard 252, a third compute-node mainboard 253 and a fourth compute-node mainboard 254.

The top chamber 210 is for the head-node mainboard 250 to be configured horizontally; one applicable location is on the middle-rear section of the upper partition board 244 (i.e. at the bottom, middle-rear section of the top chamber 244). The depth of the top chamber 210 allows one or more expansion card 260 to be vertically configured on bus slot (not marked) of the head-node mainboard 250, thereby solving the prior art problem of poor expansibility. The expansion card 260 may be graphic card, audio card and etc. to provide high-end video/audio processing features or other specific functions.

Figure 1:
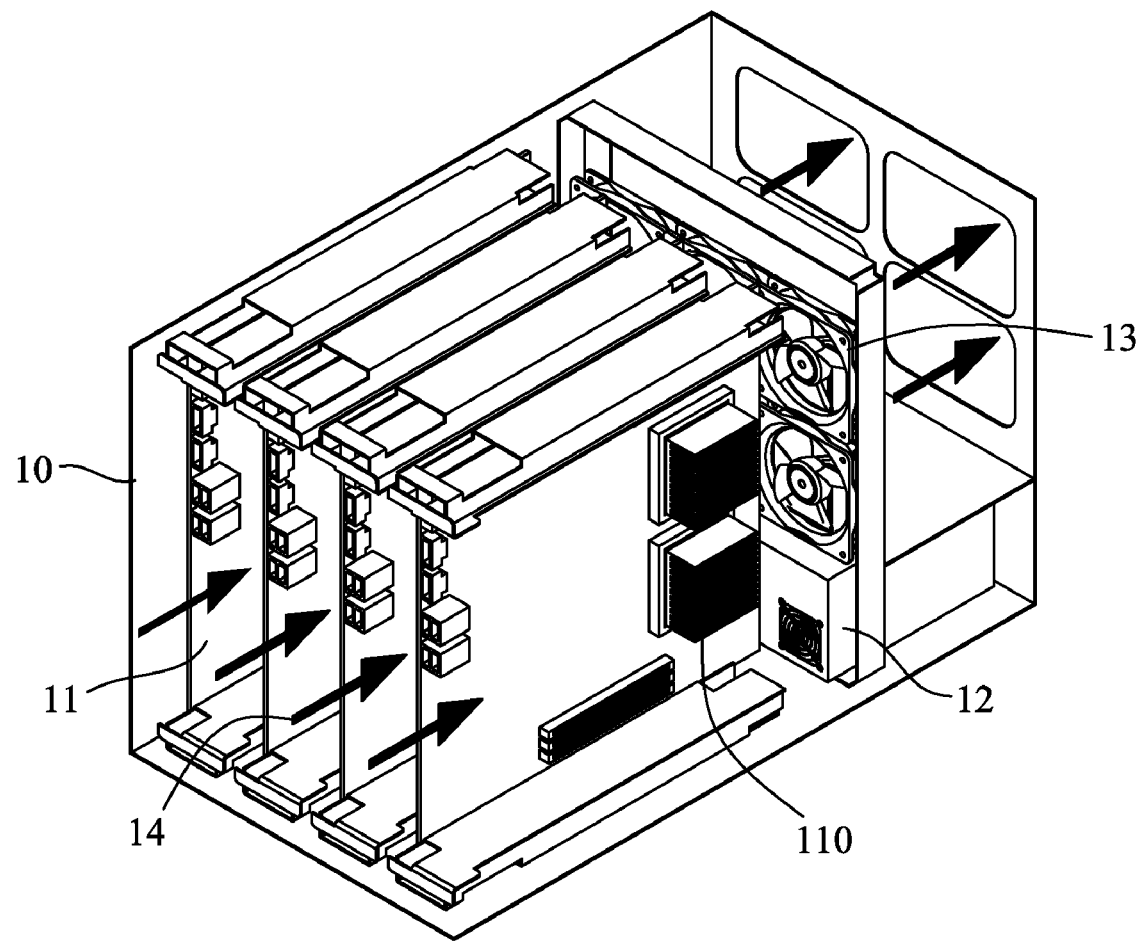
FIG. 1 is an explanatory diagram of a chassis partition framework for a personal cluster computer in the prior art.

The left chamber 220 located under the top chamber 210 is for vertically configuring the first and second compute-node mainboards 251,252. As to FIG. 1, the first compute-node mainboard 251 is configured near the left side of the left chamber 220 (i.e. the left inner surface of the chassis partition framework 200); the second compute-node mainboard 252 is configured near the middle partition board 242 but the right side of the left chamber 220. Therefore, the surfaces of the first and second compute-node mainboards 251,252 that have most electrical components may face each other. Likewise, the right chamber 230 located under the top chamber 210 is for vertically configuring the third and fourth compute-node mainboards 253,254. As to FIG. 1, the third compute-node mainboard 253 is configured near the middle partition board 242 but the left side of the right chamber 230; the fourth compute-node mainboard 254 is configured near the right side of the right chamber 230 (i.e. the right inner surface of the chassis partition framework 200). Accordingly, the surfaces of the third and fourth compute-node mainboards 253,254 that have most electrical components may face each other.

Namely, under the design of the chassis partition framework 200 according to the present invention, the first and second compute-node mainboards 251,252 and the third and fourth compute-node mainboards 253,254 are configured vertically in face-to-face alignment respectively, accompanying with the third compute-node mainboard 253 and the second compute-node mainboard 252 configured in back-to-back alignment.

Such design leads to advantages for the chassis partition framework 200 of the present invention. The narrow split spaces in the prior art are integrated to provide larger available space(s) for the left and right chambers 220,230 respectively, not only providing larger airflow channel(s) but facilitating the configuration of larger fan with low noises. Therefore, the whole system will have better performance in heat dissipation and noise reduction. In the present invention, the space between the second and third compute-node mainboards 252,253 is smaller. Since generally the rear sides of the mainboards do not need airflow and have fewer issues on mechanical interferences, such design allows larger available spaces between the first and second compute-node mainboards 251,252 and between the third and fourth compute-node mainboards. Then, fan control board(s), storage device(s), power distribution board(s) or signal connection board, may possibly be configured between the first and second compute-node mainboards 251,252 and/or between the third and fourth compute-node mainboards 253,254; the applicable locations might be at the top side and/or bottom side of the left/right chamber 220/230. The examples will be disclosed in the following embodiments.

Under the premise that each of said mainboards 250~254 remains at its same relative position, and as involved in the single, major technical feature of the present invention, the chassis partition framework 200 may provides various configuration means for the mainboards 250~254.

In the top chamber, the head-node mainboard may be directly fixed on the upper partition board 244 by using screws or other fastening members, or fixed horizontally on the inner framework(s) or inner surfaces (both not shown) of the chassis partition framework without the upper partition board. If the chassis partition framework 200 has applicable opening(s), a sliding board tray (not shown) may be used to carry the head-node mainboard and push into the chassis partition framework or pull out. Different approaches for configuring the compute-node mainboards 251~254 will be provided in the following embodiments.

Figure 3:
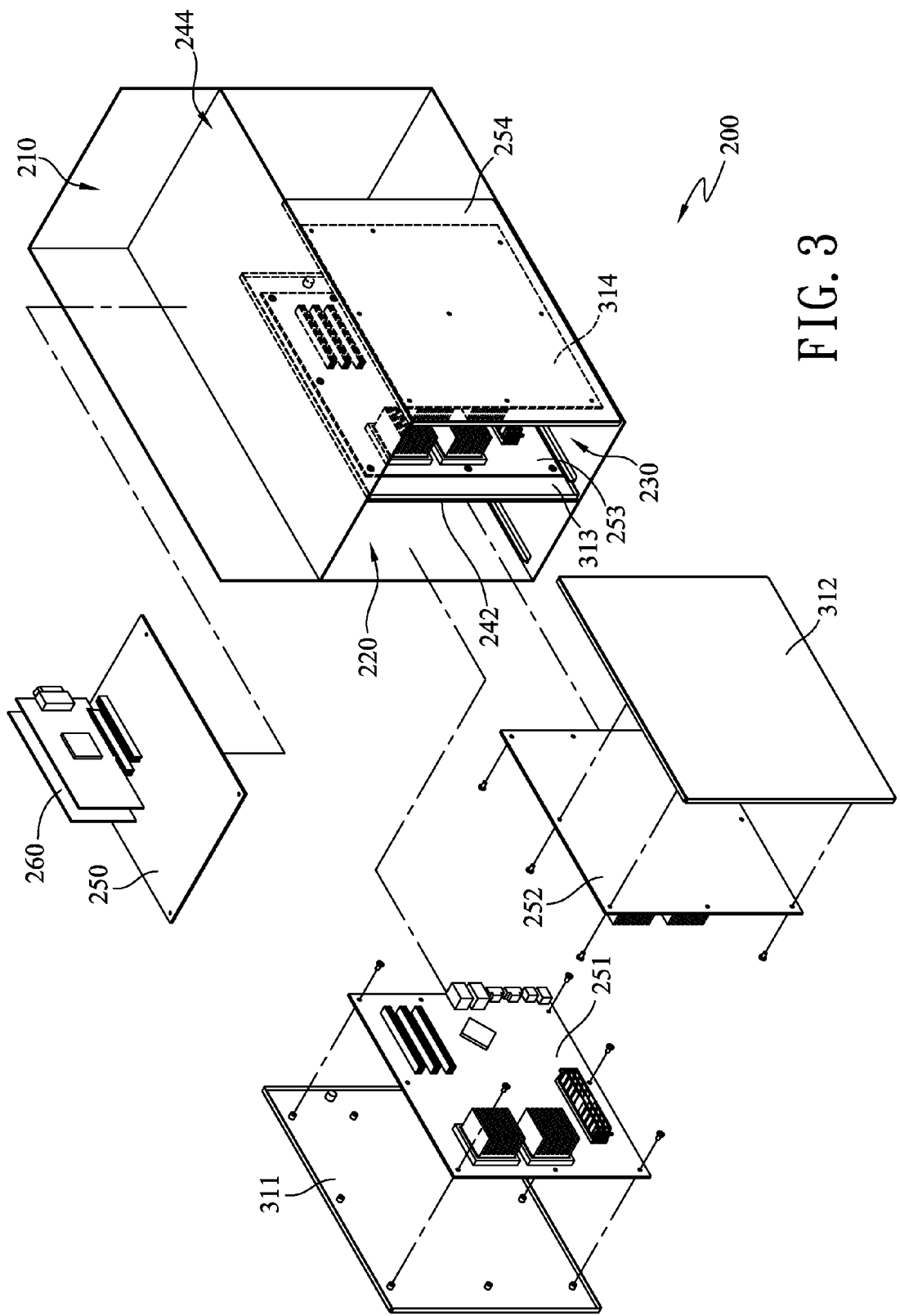
FIG. 3 is an explanatory diagram of a chassis partition framework for a personal cluster computer according to the second embodiment of the present invention.

Please refer to FIG. 3. In the second embodiment of the present invention, the chassis partition framework 200 further includes four trays 311,312,313,314, each for configuring the first, second, third and fourth compute-node mainboards 251, 252,253,254 respectively. Any type of sliding rail module (not shown) or its equivalent may be applicable to the top sides and/or the bottom sides of the left and right chambers 220,230, to allow the tray 311~314 carrying the first, second, third and fourth compute-node mainboards 251~254 and sliding into the left and right chambers 220,230 or sliding out. If necessary, the tray 311~314 may have rail-relative structures at their tops or bottoms.

Figure 4:
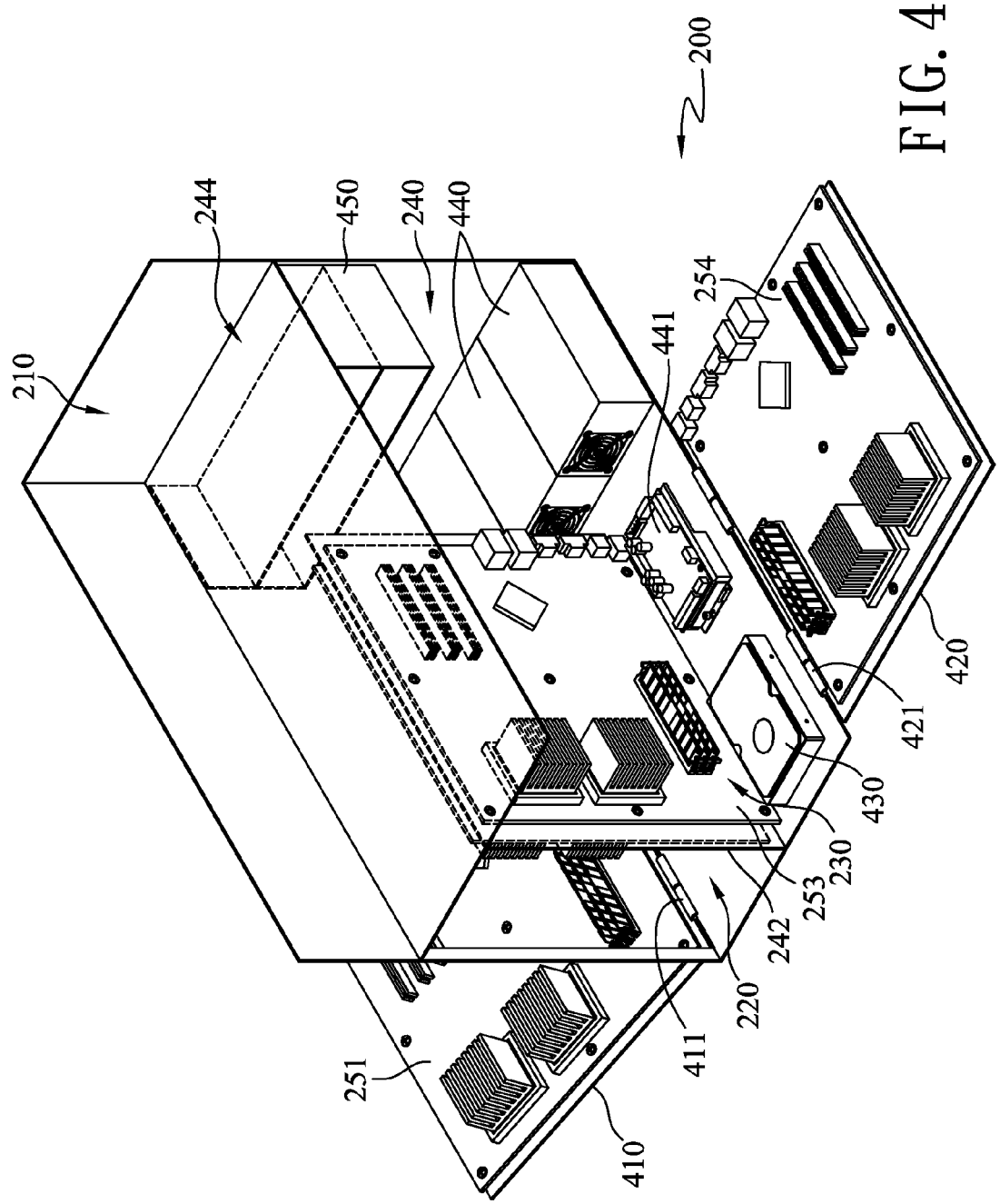
FIG. 4 is an explanatory diagram of a chassis partition framework for a personal cluster computer according to the third embodiment of the present invention.

Please refer to FIG. 4. For clearer explanation, the head-node mainboard 250 and the upper partition board 244 have been removed. In the third embodiment of the present invention, the chassis partition framework 200 further includes an openable left side-door 410 and an openable right side-door 420 for respectively configuring the first and fourth compute-node mainboards 251,252. Each of the left and right side-doors 410,420 has pivot sets 411, 421 at any position(s) on the two lateral sides of the chassis partition framework 200. One group of preferred locations are at the external sides of the left and right chambers 220,230 near the bottom, thereby enabling the left and right side-doors 410,420 to open and make the first and fourth compute-node mainboards 251,254 rotate to horizontal positions and facilitate serviceable tasks on the first and fourth compute-node mainboards 251,254. After the left/right side-doors 410,420 is opened, two openings (not shown/marked) formed at the two lateral sides of the chassis partition framework 200 allow the inner second and third compute-node mainboard 252,253 being serviceable from outside.

Besides, since larger available spaces is provided between the first and second compute-node mainboards 251,252 and between the third and fourth compute-node mainboards 253, 254, storage device 430 or power distribution board 441 may be configured horizontally at the top side and/or the bottom side of the left/right chamber 220/230. Other function modules such as fan control board(s) or signal connection board(s) may also be configured at the same locations.

If the middle partition board 242 is shorter than the upper partition board 244 or the lengthwise length of the chassis partition framework 200, a back chamber 240 may be formed under the top chamber 210 and adjacent to the rear sides of the left and right chambers 220,230. At the inner bottom of the back chamber 240, more than one power supply modules 440 may be implemented thereon; the inner top of the back chamber 240 may be configured with a rack 450. The rack 450 may be formed by metal framework and/or boards to provide one or more rectangular containing room for implementing network connection device, such as Infiniband switch and/or Gigabyte Ethernet switch (both not shown). The Infiniband switch may be used to provide internal links between the head-node mainboard 250 and the first~fourth compute-node mainboards 251~254; the Gigabyte Ethernet switch will provide external network link(s).

Figure 5:
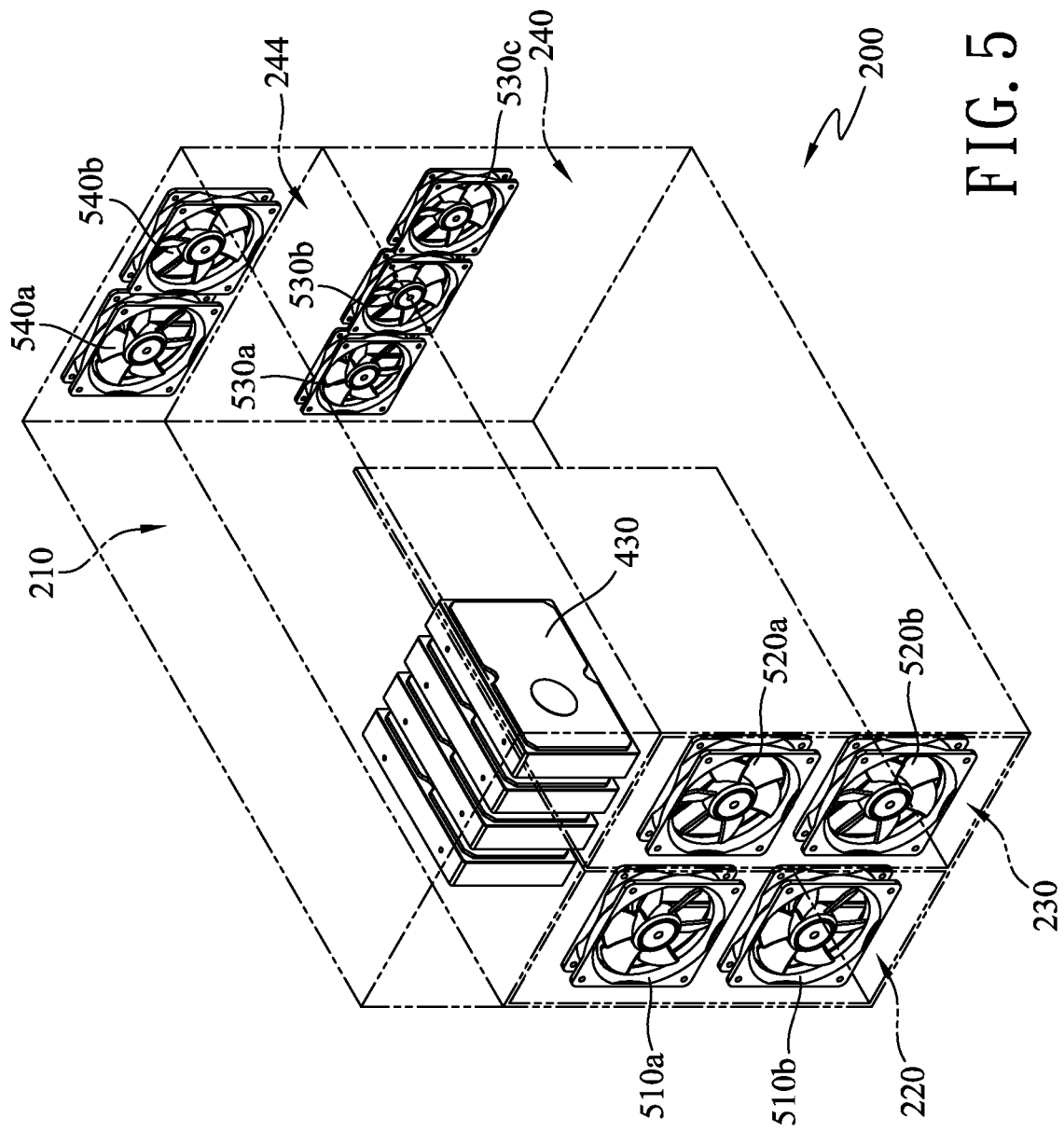
FIG. 5 is an explanatory diagram of a chassis partition framework for a personal cluster computer according to the fourth embodiment of the present invention.

Please refer to FIG. 5. Except the embedded fan(s) of the power supply module 440 in FIG. 4, the fourth embodiment of the present invention provides an approach for fan configuration of the chassis partition framework 200. For clearer explanation, the head-node mainboard 250 has been removed. First, the left/right chamber may be implemented with several front fans 510a/b,520a/b at its front side. The front fans 510a/b,520a/b may be larger than common used fans in the prior art to reach required airflow speed and pressure by lower rotation speed, thereby facilitating better heat-dissipating effects under low noises. Moreover, the middle section of the back chamber 240, i.e. the space between the power supply module 440 and the rack 450 in FIG. 4, may be used to configure several back fans 530a/b/c, to enhance the airflow generated by the front fans 510a/b, 520a/b and carry away the heat generated by the first~fourth compute-node mainboards 251~254 in the left and right chambers 220,230. The top chamber 210 may be configured with several top fans 540a/b at its rear side to carry away the heat generated from the head-node mainboard 250.

Furthermore, one of the preferred locations for the storage device 430 is at the front side of the top chamber 210, which facilitates access and configuration. The rest space at the front side of the top chamber 210 is also available for configuring I/O device switch (such as KVM switch, Keyboard-Video-Mouse switch), disk player (reader/writer) and etc. The external front side may be implemented with a front panel, integrated indicators (LEDs), power button(s) and various I/O connectors (USB/PS2/Audio/Video ports).

Figure 6:
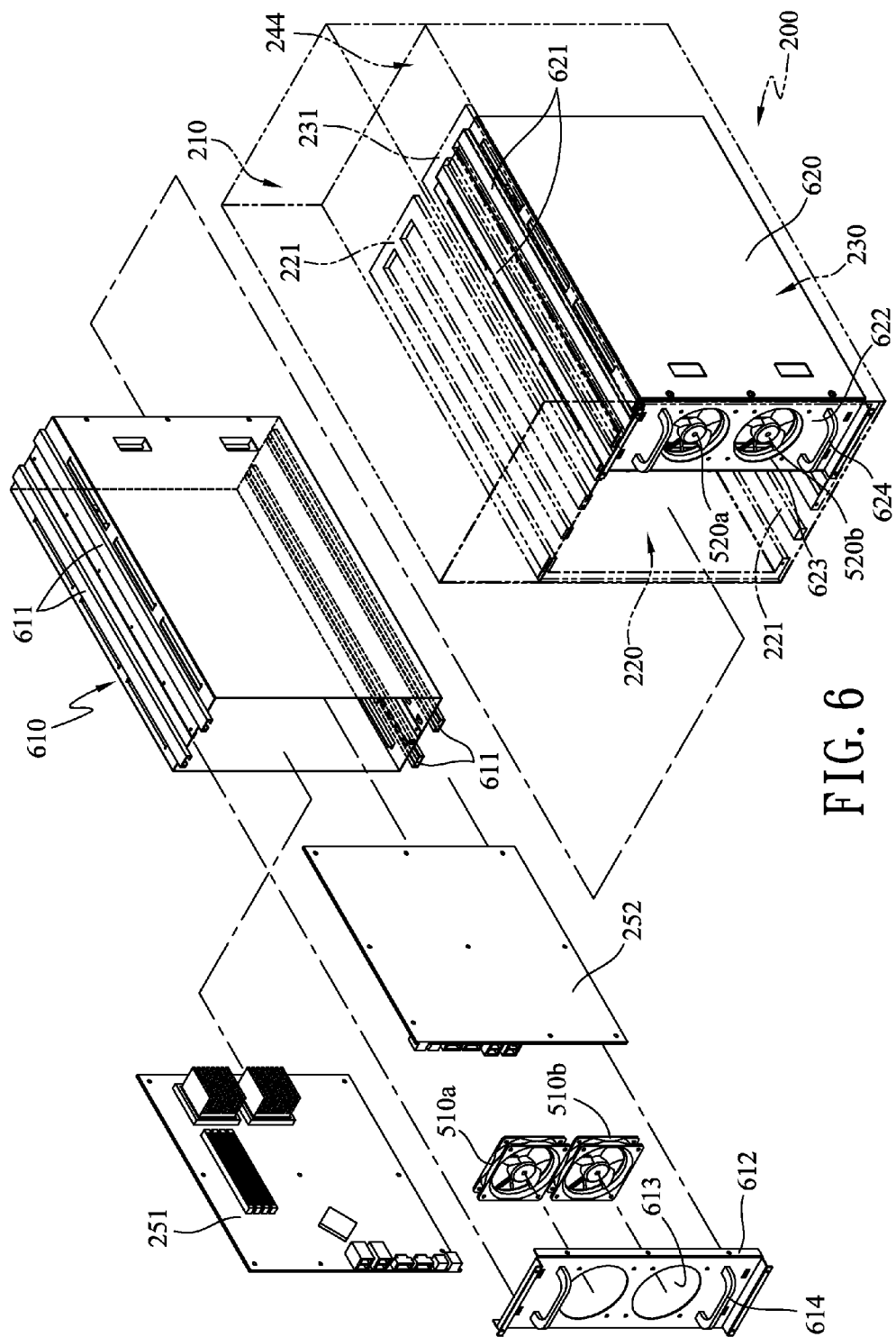
FIG. 6 is an explanatory diagram of a chassis partition framework for a personal cluster computer according to the fifth embodiment of the present invention.

Please refer to FIG. 6. Under the premise that each of said mainboards 250~254 remains at its same relative position, and as involved in the single, major technical feature of the present invention, the chassis partition framework 200 may further includes a left dual-board case 610 and a right dual-board case 620 for configuring the first~fourth compute-node mainboards 251~254 respectively. The left and right dual-board cases 610,620 are similar rectangular cases that have openings at the front/rear sides. For clearer explanation, the head-node mainboard 250 has been removed. To facilitate operation, the left/right chamber 220/230 includes comb rail set 221/231, as the E-shaped rail set shown in FIG. 6, which may be configured at the top side and/or the bottom side of the left/right chamber 220/230. Each comb rail set 221/231 includes plural parallel rails with their rear ends connecting each other, thereby remaining the comb rail set 221/231 open but the rear side of the comb rail set 221/231 closed. The left/right dual-board case 610/620 includes several straight positioning rails 611/621 corresponding to the comb rail set 221/231 and located at the top side and/or the bottom side thereon. The positioning rails 611/621 may engage with the comb rail set 221/231 to enable relative movements, such as make the left and right dual-board cases 610,620 slide into the left and right chambers 220,230 or slide out. Meanwhile, the closed ends of the comb rail set 221,231 may limit the left and right dual-board cases 610,620 while moving inwards.

In addition, to facilitate the push-pull operations of the left/right dual-board case 610/620, a cover 612/622 with a handle 614/624 may be implemented at the front side. Front fans 510a/b,520a/b may also be configured in airflow holes 613,623 on the covers 612,622. Inside the left and right dual-board cases 610,620, the top side and/or the bottom side may be configured horizontally with storage device(s), fan control board(s), power distribution board(s) and/or signal connection board(s) without influencing the heat-dissipating airflow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chassis partition framework for configuring a personal cluster computer with a head-node mainboard, a first compute-node mainboard, a second compute-node mainboard, a third compute-node mainboard and a fourth compute-node mainboard, the chassis partition framework comprising:
   an upper partition board horizontally arranged to define a top chamber for configuring the head-node mainboard such that a back of the head-node mainboard is parallel to the upper partition board; and
   a middle partition board arranged orthogonally to the upper partition board, defining a left chamber located under the top chamber and arranged for vertically configuring the first and second compute-node mainboards therein in face-to-face alignment, and a right chamber also located under the top chamber and adjacent to a right side of the left chamber, and arranged for vertically configuring the third and fourth compute-node mainboards therein in face-to-face alignment;
   wherein the middle partition board is arranged for configuring the third compute-node mainboard and the second compute-node mainboard in back-to-back alignment.

2. The chassis partition framework of claim 1 further comprising an openable left side-door and an openable right side-door for configuring the first and fourth compute-node mainboards thereon respectively.

3. The chassis partition framework of claim 1 further comprising a back chamber located under the top chamber and adjacent to the rear sides of the left and right chambers.

4. The chassis partition framework of claim 3, wherein the back chamber is for configuring with at least one back fan at its middle rear section and with at least one power supply at its bottom side.

5. The chassis partition framework of claim 4, wherein the back chamber is for configuring with a rack at its top side for configuring at least one network connection device.

6. The chassis partition framework of claim 1, wherein the left or right chamber comprises at least one comb rail set, configuring at a top side and/or a bottom side of the left or right chamber.

7. The chassis partition framework of claim 6, wherein the comb rail set comprises a plurality of parallel rails with their rear ends connecting each other, thereby remaining the front side of the comb rail set open but the rear side of the comb rail set closed.

8. A chassis partition framework for configuring a personal cluster computer with a head-node mainboard, a first compute-node mainboard, a second compute-node mainboard, a third compute-node mainboard and a fourth compute-node mainboard, the chassis partition framework comprising:
   a top chamber for horizontally configuring the head-node mainboard;
   a left chamber located under the top chamber for vertically configuring the first and second compute-node mainboards therein in face-to-face alignment; and
   a right chamber located under the top chamber and adjacent to a right side of the left chamber, for vertically configuring the third and fourth compute-node mainboards therein in face-to-face alignment, wherein the third compute-node mainboard and the second compute-node mainboard being configured in back-to-back alignment;
   a left dual-board case arranged to be received in the left chamber; and
   a right dual-board case arranged to be received in the right chamber;
   wherein the left dual-board case and right-dual board case are configured to slide into and out of the left chamber and right chamber, respectively.

9. The chassis partition framework of claim 8, wherein the left dual-board case is for vertically configuring the first and second compute-node mainboards in face-to-face alignment, and the right dual-board case is for vertically configuring the third and fourth compute-node mainboards in face-to-face alignment.

10. The chassis partition framework of claim 8, wherein an inner top side and/or an inner bottom side of the left or right dual-board case is for horizontally configuring at least one storage device, at least one fan control board, at least one power distribution board and/or at least one signal connection board.

11. The chassis partition framework of claim 8, wherein the left or right dual-board case comprises a cover configured at its front side.

12. The chassis partition framework of claim 11, wherein the cover comprises at least one handle.

13. The chassis partition framework of claim 11, wherein the cover comprises at least one airflow hole for configuring at least one front fan.

14. The chassis partition framework of claim 1 further comprising a plurality of trays for configuring the first, second, third and fourth compute-node mainboards, thereby enabling said compute-node mainboards to be pushed into the left chamber or the right chamber or pull out.

15. The chassis partition framework of claim 1, wherein an top side and/or an bottom side of the left or right chamber is for horizontally configuring at least one storage device, at least one fan control board, at least one power distribution board and/or at least one signal connection board.

16. The chassis partition framework of claim 1 further comprising an upper partition board to divide the top chamber and the left and right chambers below, for configuring the head-node mainboard at the bottom of the top chamber.

17. The chassis partition framework of claim 1, wherein the top chamber is for configuring plural at least one hard drive, at least one disk player and/or at least one I/O device switch at its front side, and configuring at least one top fan at its rear side.

18. The chassis partition framework of claim 1, wherein a front side of the left or right chamber is for configuring at least one front fan.

19. The chassis partition framework of claim 8, wherein the left or right chamber comprises at least one comb rail set, configuring at a top side and/or a bottom side of the left or right chamber, and the left or right dual-board case comprising a plurality of positioning rails corresponding to the comb rail set and located at a top side and/or a bottom side thereon, thereby enabling the left or right dual-board case to slide into the left or right chamber or slide out.

* * * * *